F. J. MOSER.
REEL.
APPLICATION FILED MAR. 14, 1911.

1,028,770.

Patented June 4, 1912.

Witnesses
Blanche Hartman
Vinnie C. Hess

Inventor
Fred J. Moser
by H. C. Lord
Attorney

UNITED STATES PATENT OFFICE.

FRED JOSEPH MOSER, OF KANE, PENNSYLVANIA.

REEL.

1,028,770.

Specification of Letters Patent.

Patented June 4, 1912.

Application filed March 14, 1911. Serial No. 614,290.

*To all whom it may concern:*

Be it known that I, FRED J. MOSER, a citizen of the United States, residing at Kane, county of McKean, and State of Pennsylvania, have invented new and useful Improvements in Reels, of which the following is a specification.

This invention relates to reels and consists in certain improvements in the construction thereof as will be hereinafter fully described and pointed out in the claims.

The reel forming the subject matter of this invention is peculiarly adapted for handling measuring lines used in deep wells but may be useful for other purposes.

Figure 1:
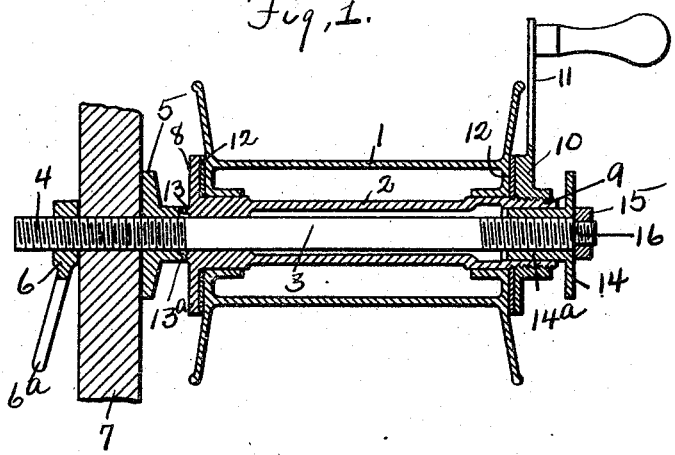
Figure 2:
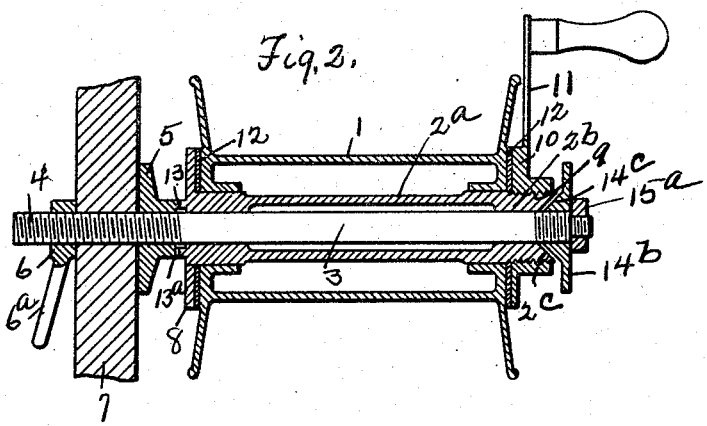

The invention is along the general lines of the reels shown in my former Patent #923,559 dated June 1, 1909, and Patent #964,116, dated July 12, 1910.
The invention is illustrated in the accompanying drawings as follows:

Figure 1 shows a central longitudinal section through the reel. Fig. 2 a similar view of an alternative construction.

1 marks the spool, 2 the sleeve or hollow shaft on which the spool is mounted. The shaft 3 has the screw threaded end 4 on which is the flange nut 5 and the clamp nut 6 with the handle 6ª.
7 marks any convenient means of support on which the reel may be mounted by extending the shaft 3 through the support and clamping it in position with the support between the nuts 5 and 6.
The sleeve or hollow shaft 2 has the flange 8 on the end next to the spool. The opposite end of the sleeve has a screw threaded portion 9 on which the screw threaded hub 10 is mounted. Friction washers 12—12 are arranged between the flange 8 and the hub 10 and the ends of the spool. The hub is provided with a crank 11. The screw threaded end 9 of the sleeve is journaled on the extension 14ª by the flange nut 14. This flange nut is locked in place by a jam nut 15 which is screwed against the shoulder 16 at the end of the shaft.

In the construction shown in my former patent, in order to lock the sleeve 2 so as to actuate the hub 10, a locking device was arranged at the supporting end of the reel. The principal object of the present invention is to simplify that construction and to so form the reel that the locking of the sleeve may be accomplished from the crank end of the reel. In carrying out this purpose, the end of the sleeve is provided with the projections 13 which interlock with the projections 13ª on the face of the nut 5.
These projections form what is commonly known as a detent clutch. It will be readily observed, that the clutch formed between the sleeve and the nut 5 may be thrown into or out of engagement through the operation of the crank, that is to say, the operator may without releasing his hold on the crank shove the sleeve and spool endwise on the shaft so as to lock or unlock this detent clutch.

In the operation of the device, the detent clutch is thrown in, and if it is desired to wind up the reel, the crank is screwed on to the sleeve so as to securely clamp the spool between the flange 8 and the hub 10. The sleeve is then drawn out axially so as to break the engagement between the sleeve and the nut 5. The reel may then be wound up in the ordinary manner. In reversing the operation, the sleeve is pushed inwardly so as to bring the clutch into engagement and the hub unscrewed so as to release the spool. By operating the crank it is possible to brake the movement of the spool so as to give any speed to the measuring line that may be desired.

In the alternative construction shown in Fig. 2, the sleeve 2ª is mounted directly on the shaft 3, the end 2ᵇ being thickened for this purpose. A flange nut 14ᵇ having the cone surface 14ᶜ operates against the cone surface 2ᶜ to limit its outward movement. The jam nut 15ª locks the nut 14ᵇ in place. Otherwise the structure is similar to that shown in Fig. 1 and operates in the same manner.

What I claim as new is:

1. In a reel, the combination of a spool; a crank; a mounting for the spool and crank; devices operative from the crank end of the mounting for locking the crank mounting against rotary movement; and means for locking the crank with and releasing the crank from the spool.

2. In a reel, the combination of a spool; a crank; a mounting for the spool and crank; devices operative from the crank end of the mounting for locking the crank mounting against rotary movement; and means for locking the crank and spool together as the crank is turned relatively to the mounting in one direction and for releasing it therefrom as the crank is turned in the opposite direction.

3. In a reel, the combination of a spool; a crank having a screw threaded hub; concentric mountings for the crank and spool, the crank mounting being screw threaded to operate with the screw threaded mountings on the crank hub; devices operative from the crank end of the mounting for holding the crank mounting against rotation as the crank is turned relatively to the mounting.

4. In a reel, the combination of a sleeve on which the spool is rotatively mounted, said sleeve having a flange at one end and a screw thread at the opposite end; a crank having a screw threaded hub mounted on the screw threaded sleeve and adapted to operate on said screw to clamp the crank and spool together, or to brake the spool; a shaft on which the sleeve is mounted; and devices operative from the crank for locking the sleeve against rotation.

5. In a reel, the combination of a shaft; a spool mounted on the shaft; a crank; brake flanges; means actuated by the crank for locking the brake flanges to the spool so that they will rotate with the spool and for disengaging them therefrom; and means operative from the crank for locking one of the brake flanges to the shaft and for disengaging it therefrom.

6. In a reel, the combination of a stationary shaft; a sleeve mounted on the shaft; a spool mounted on the sleeve; means for locking and releasing the shaft from the sleeve arranged at one end of the reel; devices for driving the spool with the sleeve and retarding its revolution at the opposite end of the reel; and mechanism operative from the opposite end of the reel from said means for actuating said means.

7. In a reel, the combination of a shaft; a spool; a hollow sleeve; a crank mounted thereon; means operative from the crank for locking said sleeve with said shaft and for disengaging it therefrom; and means actuated by the crank for braking said spool while said hollow sleeve is locked to said shaft.

8. In a reel, the combination of a shaft; means at one end for securing it to a support; a sleeve mounted on the shaft; a spool mounted on the sleeve; means for locking and releasing the shaft from the sleeve arranged at the supported end of the shaft; devices for driving the spool with the sleeve and for retarding its revolution; and mechanism operative with said devices for actuating said means.

In testimony whereof I have hereunto set my hand in the presence of two subscribing witnesses.

FRED JOSEPH MOSER.

Witnesses:
W. W. HETRICK,
JANE MACDONALD.